Nov. 30, 1926.

H. M. BLACK 1,608,644

METHOD OF AND APPARATUS FOR FORMING SHEET GLASS

Filed March 1, 1926     3 Sheets-Sheet 1

INVENTOR
HAROLD M. BLACK

Nov. 30, 1926

H. M. BLACK 1,608,644

METHOD OF AND APPARATUS FOR FORMING SHEET GLASS

Filed March 1, 1926     3 Sheets-Sheet 2

INVENTOR
HAROLD M. BLACK

Nov. 30, 1926.

H. M. BLACK 1,608,644

METHOD OF AND APPARATUS FOR FORMING SHEET GLASS

Filed March 1, 1926    3 Sheets-Sheet 3

INVENTOR
HAROLD M. BLACK
By Robson & Brown
Attorney

Patented Nov. 30, 1926.

1,608,644

UNITED STATES PATENT OFFICE.

HAROLD M. BLACK, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed March 1, 1926. Serial No. 91,355.

My invention relates to a method and apparatus for forming sheet glass, and particularly to the rolling of plate glass by a continuous process.

One of the methods heretofore employed for manufacturing plate glass consists in flowing a stream of glass from a spout upon a receiving roll and against a sheet-forming roll, the spout being relatively narrow as compared to the finished sheet, so as to secure a stream of such depth as will avoid waves and overlaps and excessive cooling of the glass before reaching the receiving roll. This relatively narrow, deep, stream has been directed against the breast of a sheet-forming roll and caused to flow laterally to form a sheet of the desired width. However, those portions of the mass of glass which are deflected laterally become chilled through contact with the roll or otherwise, causing ream or other defects in the finished sheet.

My invention has for its object the provision of means whereby molten glass can be more effectively spread to form a sheet of glass which will be of high quality when ground and polished.

Another object of my invention is to provide a means for forming glass sheets wherein ream and other irregularities are reduced to a minimum.

Figure 1:
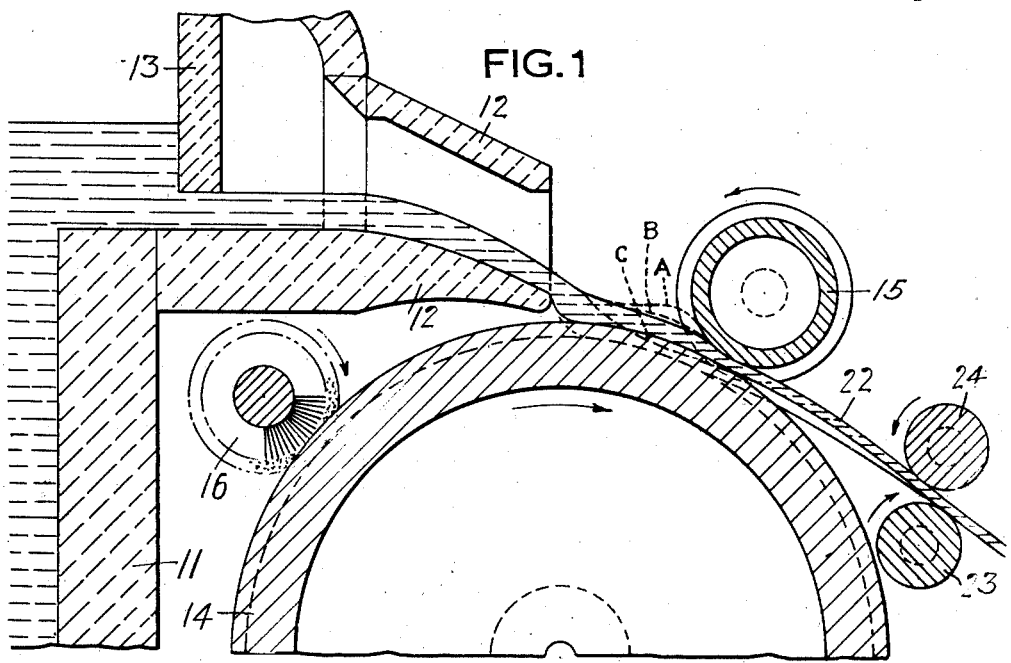
Figure 2:
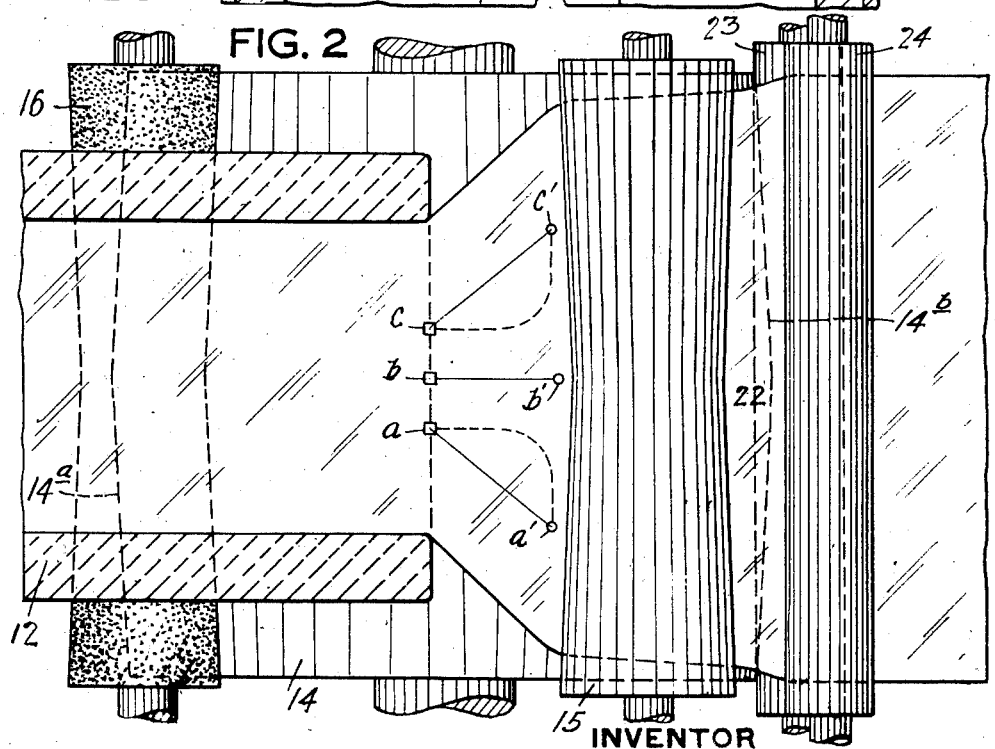
Figure 3:
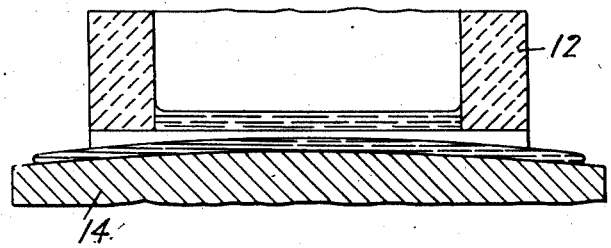
Figure 4:
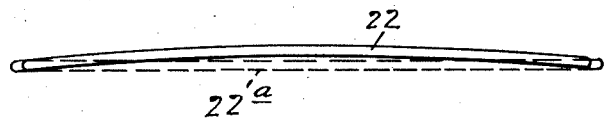
Figure 5:
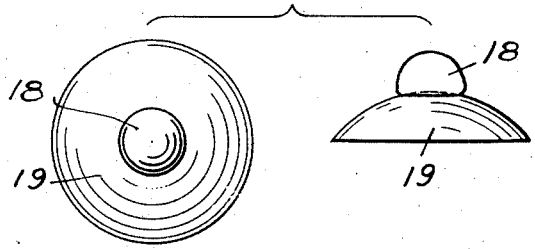
Figure 6:
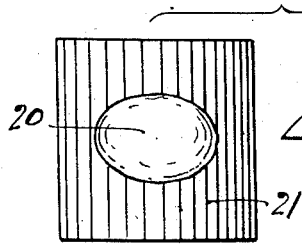
Figure 7:
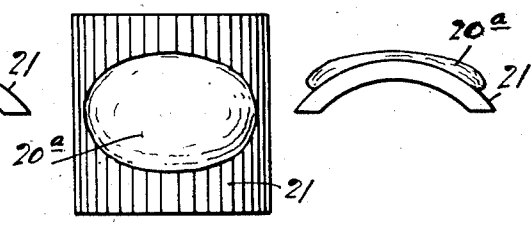
Figure 8:
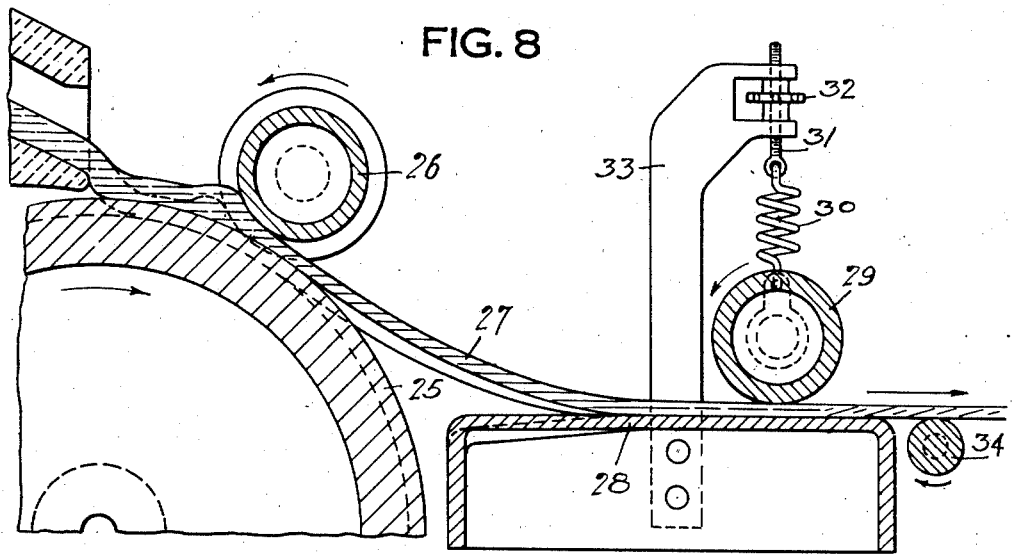
Figure 9:
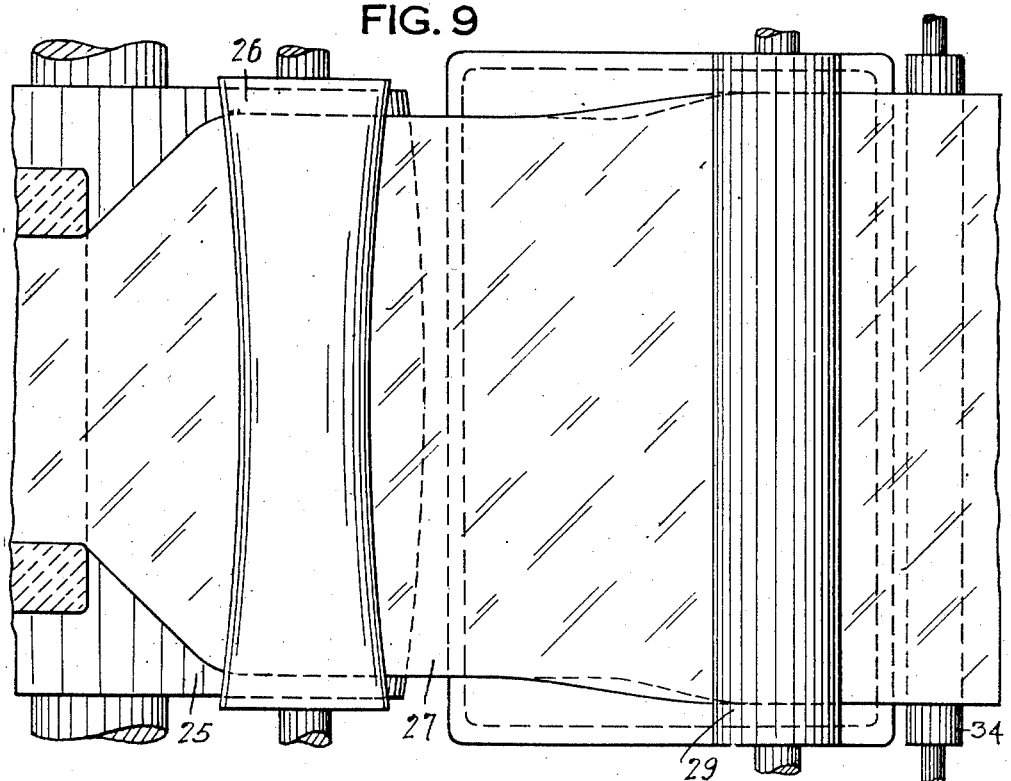

Some of the ways by which my invention may be practiced are shown in the accompanying drawing, wherein Fig. 1 is a sectional view showing a portion of a glass furnace and sheet-forming mechanism mounted in conjunction therewith; Fig. 2 is a plan view of the apparatus of Fig. 1; Fig. 3 is a transverse sectional view of the apparatus of Fig. 1, looking toward the discharge end of the spout; Fig. 4 is a transverse sectional view of the initial sheet of glass, the section being taken forwardly of the sheet-forming rolls of Fig. 1; Fig. 5 is a view showing the manner in which a mass of molten glass will spread if placed upon a spherical surface; Figs. 6 and 7 are views showing the spreading action of the glass when placed upon a cylindrical surface; Fig. 8 is a view similar to Fig. 1, but showing a modified form of apparatus, and Fig. 9 is a plan view showing a portion of the apparatus of Fig. 8.

In Fig. 1 I show a portion of a glass furnace or forehearth 11 provided with a spout 12 and a gate 13 for controlling the flow of glass to the spout.

At the forward end of the spout a roll 14 is provided which serves as a table upon which the glass discharged from the spout 12 is rolled to sheet form by a roller 15. A brush roll 16 is provided for cleaning the surface of the roll 14. The rollers 14, 15 and 16 may be driven from any suitable source of power (not shown). The peripheral surface of the roll 14 is of convex form as indicated by the lines 14$^a$ and 14$^b$ of Fig. 2. The roll 15 is of concave form, as shown more clearly in Fig. 2, with its surface complemental to the adjacent surface of the roll 14.

When the molten glass is deposited upon the roll 14 it tends to flow in a lateral direction, toward the ends of the roll, thus effecting spreading action thereof independently of the sheet-forming roll 15, although in many cases the glass may accumulate slightly against the face of the roll 15. If a mass of molten glass 18 be deposited upon a spherical surface 19, as shown in Fig. 5, the mass 18 will flow downwardly along the surface 19 in all directions, and maintain a substantially circular contour. If a mass of glass 20 be deposited upon a cylindrical surface 21, as shown in Figs. 6 and 7, the mass will assume an elongated or oval form. If the glass be sufficiently fluid and the cylindrical surface has a sharp enough curvature, the mass of glass may assume the shape shown at 20$^a$ in Fig. 7 before becoming chilled.

Therefore, it is possible to effect substantially any desired rate of spreading flow of the glass upon the roll 14 in order to provide sufficient glass at the ends of the roll 14 to form a sheet whose edges have the desired thickness.

In Fig. 2 I have indicated approximately the directions in which particles of glass $a$, $b$, and $c$ will flow. In ordinary practice, particles at $a$ and $c$ would follow paths indicated by the dotted lines, since they would first be brought against the mid portion of the roll and then deflected laterally. If the table or roll 14 be curved, however, the glass from $a$ and $c$ will follow approximately straight paths to the points $a'$ and $c'$ respectively, and such particles of glass will complete their travel in substantially the same period of time that is required for the particles to flow from $b$ to $b'$, because of the gravitational force exerted upon the particles from $a$ and $c$, by reason of the curvature of the roll 14. Therefore, the particles at the points $a$, $b$ and $c$ occupy the same general relative positions in the completed sheet occupied by them in the stream of glass, thus reducing relative displacement of the particles of molten glass, and consequently the tendency toward the formation of ream in the sheet.

If the receiving roll 14 (Fig. 1) had a cylindrical surface, the glass would build up in a mass against the roll 15 and with a considerable depth at the center, forming a contour A which would tend to chill and mix and roll into the hotter glass, causing ream.

Owing to the lateral spreading caused by the lateral gravity flow on the convex receiving roller, instead of contour A we have one more like B at the center of the roll 15 and C near the end of roll 15, and but slight building up against the roll. Also, less glass would be in storage between the roll 15 and spout 12, and this would mean less difference in time of transit of one particle relative to another and would therefore cause the glass to pass under the roll at a more even average temperature.

The glass deposited upon the roll 14 is spread by the roller 15 to form a sheet 22 which is convex in cross section as indicated in Figs. 1 and 4. The sheet while still hot is then passed between the flattening rolls 23 and 24. The flattening of the sheet causes it to assume the form shown in Fig. 4 by dotted lines 22$^a$.

In Fig. 8 I have shown rollers 25 and 26 that correspond to the rollers 14 and 15, of Fig. 1, and which form a sheet 27 of convex form. However, instead of passing the sheet 27 through flattening rolls as in Fig. 1, it is directed to a table 28 which is of convex form at its glass receiving end, and gradually changes to flat form toward its discharge end. The sheet 27 may be of such temperature that it will follow the contour of the surface of the table 28 and thereafter settle to flat form without the employment of flattening rolls.

In case the sheet 27 is advanced too rapidly to permit it to settle to the surface of the table 28, or is too cool to assume a flattened form by its own weight, I provide a flattening roll 29 that is secured at each end to a spring 30 that is in turn connected to an eye bolt 31 which has screw threaded engagement with an adjusting nut 32. Each of the nuts 32 is carried in a bracket 33 secured to the table 28. By rotating the nut 32 the pressure exerted upon the sheet of glass by the roll 29 may be controlled and the sheet may be advanced by feed rollers of any suitable form, one of which is indicated at 34, and fed into a leer for treatment in the usual manner.

While I have shown and described my invention as applied to the formation of glass sheets, it will be apparent that the method and apparatus may be employed in the formation of sheets or slabs of various other kinds of plastic materials.

I claim as my invention:

1. The method of forming sheet glass, which comprises depositing a stream of molten glass upon a moving table having a convex surface.

2. The method of forming sheet glass, which comprises depositing a stream of molten glass upon a moving table having a convex surface, and reducing the thickness of the glass while on said table, by a sheet-forming member of concave form.

3. The method of forming sheet glass which consists in depositing a stream of molten glass upon the mid portion of a roll of convex form, and rotating said roll.

4. The method of forming sheet glass, which consists in depositing a stream of molten glass upon the mid portion of a roll of convex form, and moving said roll beneath a concave surface to effect spreading of the glass.

5. The method which comprises depositing molten glass upon a convex surface while imparting relative movement to said surface and said glass in a substantially horizontal plane, and flattening said glass after it becomes partially set.

6. The method which comprises depositing molten glass upon a convex surface while imparting relative movement to said surface and said glass in a substantially horizontal plane.

7. Apparatus for forming sheet glass comprising a roll of convex form, means for depositing molten glass upon the mid portion of said roll, and a concave roll co-operating with the first-named roll to effect uniform distribution of the glass in the form of a sheet.

8. Sheet glass forming apparatus comprising a movable member of convex form, and means for directing a flow of molten glass to approximately the mid portion of said member.

9. Sheet-glass forming apparatus comprising a movable member of convex form, means for directing a flow of molten glass to approximately the mid portion of said member, and a concave member for engaging the upper surface of glass so deposited in order to effect distribution thereof and form a sheet of the desired thickness.

10. Sheet glass forming apparatus comprising a movable member of convex form, means for directing a flow of molten glass to approximately the mid portion of said member, and means for flattening said glass when it becomes partially set.

11. The method of forming sheet glass, which comprises directing a stream of molten glass to a receiving surface in advance of a sheet-forming roll, causing said glass to flow in a direction diagonal to the longitudinal axis of the stream, independently of the action of said roll, and thereafter passing the glass under said roll.

12. The method of forming sheet glass, which comprises directing a stream of molten glass to a receiving surface in advance of a sheet-forming roll, causing said glass to flow in a direction diagonal to the longitudinal axis of the stream, independently of the action of said roll, and thereafter passing the glass in a forward direction under said roll.

13. The method of forming sheet glass, which comprises directing a stream of molten glass of relatively great thickness toward a sheet-forming roll, and causing said stream to spread to a depth not greatly in excess of the finished sheet of glass, immediately preceding contact with the roll.

14. The method of forming sheet glass, which consists in flowing a stream of glass toward a sheet-forming roll, causing said stream to spread laterally before contacting with the roll, and advancing all spread portions of the stream at substantially a uniform rate of speed.

15. The method of forming sheet glass, which comprises rolling a molten mass of glass to a sheet that is curved in cross section, and flattening said sheet while still plastic.

16. The method of making sheet glass, which comprises forming a sheet of the desired thickness, and thereafter increasing the width of said sheet.

17. The method of forming sheet glass, which comprises depositing a mass of molten glass upon a convex surface, and rolling said mass while on said surface.

18. The method of forming sheet glass, which comprises rolling a mass of molten glass into a sheet that is partially cylindrical in cross section, flattening the sheet while still plastic, and thereafter annealing the same.

19. The method of forming sheet glass, which comprises rolling a mass of molten glass into a sheet that is partially cylindrical in cross section, and flattening the sheet while being moved from rolling position to annealing position.

Signed at Butler, Pa., this 25th day of February, 1926.

HAROLD M. BLACK.